US011252662B2

(12) United States Patent
Wang (10) Patent No.: US 11,252,662 B2
(45) Date of Patent: Feb. 15, 2022

(54) RESOURCE CONSERVATION IN WAKING UP WAKE-UP RADIO (WUR) TERMINALS

(71) Applicant: Huawei Technologies Co., Ltd., Shenzhen (CN)

(72) Inventor: Yungui Wang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 16 days.

(21) Appl. No.: 16/800,026

(22) Filed: Feb. 25, 2020

(65) Prior Publication Data

US 2020/0196239 A1   Jun. 18, 2020

Related U.S. Application Data

(63) Continuation of application No. PCT/CN2018/101837, filed on Aug. 23, 2018.

(30) Foreign Application Priority Data

Aug. 25, 2017 (CN) .......................... 201710743108.3

(51) Int. Cl.
*H04W 52/02* (2009.01)

(52) U.S. Cl.
CPC ... *H04W 52/0219* (2013.01); *H04W 52/0235* (2013.01)

(58) Field of Classification Search
CPC ......... H04W 52/0219; H04W 52/0235; H04W 52/0225; H04W 88/06; H04W 76/40; H04W 68/02; H04W 52/0254; H04W 52/0229; H04W 76/28; H04W 52/02; H04W 52/0203; Y02D 30/70

See application file for complete search history.

(56) References Cited

U.S. PATENT DOCUMENTS

| | | | |
|---|---|---|---|
| 2010/0113045 A1 | 5/2010 | Iwamura et al. | |
| 2013/0021957 A1 | 1/2013 | Fang et al. | |
| 2013/0121221 A1 | 5/2013 | Homchaudhuri et al. | |
| 2013/0170430 A1 | 7/2013 | Wentink | |
| 2014/0086131 A1 | 3/2014 | Seok | |
| 2014/0112111 A1 | 4/2014 | Zhu et al. | |
| 2014/0211678 A1* | 7/2014 | Jafarian | H04W 52/0229 370/311 |
| 2014/0314054 A1 | 10/2014 | Seok et al. | |

(Continued)

FOREIGN PATENT DOCUMENTS

| CN | 101841911 A | 9/2010 |
|---|---|---|
| CN | 102892082 A | 1/2013 |

(Continued)

OTHER PUBLICATIONS

Wang, Yu, et al. "MAC layer design and evaluation of a narrowband Wi-Fi system." 2017 IEEE 28th Annual International Symposium on Personal, Indoor, and Mobile Radio Communications (PIMRC). IEEE, 2017. (Year: 2017).*

*Primary Examiner* — Sharad Rampuria
(74) *Attorney, Agent, or Firm* — Conley Rose, P.C.

(57) ABSTRACT

A method and an apparatus for waking up a WUR terminal in a wireless network are disclosed. The method includes: A radio access point sends a group identifier to at least one WUR terminal; and sends a WUR wake-up packet including a group identifier of a target group, to attempt to wake up all WUR terminals in the target group.

20 Claims, 4 Drawing Sheets

(56) References Cited

U.S. PATENT DOCUMENTS

| | | |
|---|---|---|
| 2015/0208349 A1 | 7/2015 | Ramamurthy et al. |
| 2015/0282009 A1 | 10/2015 | Iwai et al. |
| 2016/0077573 A1 | 3/2016 | Lee et al. |
| 2016/0219512 A1 | 7/2016 | Asterjadhi et al. |
| 2016/0374018 A1 | 12/2016 | Min et al. |
| 2017/0111858 A1 | 4/2017 | Azizi et al. |
| 2018/0184379 A1* | 6/2018 | Liu ................... H04W 52/0219 |
| 2018/0332534 A1 | 11/2018 | Hou et al. |

FOREIGN PATENT DOCUMENTS

| | | |
|---|---|---|
| CN | 103563457 A | 2/2014 |
| CN | 104301122 A | 1/2015 |
| CN | 104796971 A | 7/2015 |
| CN | 105430758 A | 3/2016 |
| CN | 106604377 A | 4/2017 |
| CN | 106998582 A | 8/2017 |
| CN | 103782634 B | 11/2017 |
| EP | 2763493 A1 | 8/2014 |
| JP | H08242478 A | 9/1996 |
| JP | 2016509437 A | 3/2016 |
| WO | 2008123079 A1 | 10/2008 |
| WO | 2009011065 A1 | 1/2009 |
| WO | 2013077690 A1 | 5/2013 |
| WO | 2014054237 A1 | 4/2014 |

\* cited by examiner

RESOURCE CONSERVATION IN WAKING UP WAKE-UP RADIO (WUR) TERMINALS

CROSS-REFERENCE TO RELATED APPLICATIONS

This is a continuation of Int'l Patent App. No. PCT/CN2018/101837 filed on Aug. 23, 2018, which claims priority to Chinese Patent App. No. 201710743108.3 filed on Aug. 25, 2017, which are incorporated by reference.

TECHNICAL FIELD

This disclosure relates to the field of communications technologies, and in particular, to a method and an apparatus for waking up a wake-up radio (WUR) terminal in a wireless network.

BACKGROUND

If a wireless local area network (WLAN) is applied to the Internet of Things, power consumption of a WLAN device needs to be reduced. To reduce the power consumption, in the WLAN device, when a radio access point and a WUR terminal do not need to communicate, the WUR terminal enters a sleep state. When the radio access point and the WUR terminal need to communicate, the radio access point wakes up the WUR terminal by sending a wake-up packet to the WUR terminal. When the WUR terminal enters the sleep state, a WUR radio frequency (RF) circuit in the WUR terminal enters a working state. Power consumption of the WUR radio frequency circuit during working is very small. The WUR terminal receives, by using the WUR RF circuit, the wake-up packet sent by the radio access point. After receiving the wake-up packet sent by the radio access point, the WUR RF circuit wakes up the WUR terminal.

When needing to wake up a plurality of WUR terminals, the radio access point sends a wake-up packet to each WUR terminal in sequence. However, in this wake-up manner, a large amount of air interface time and a large quantity of resources of the radio access point are consumed, and network overheads are increased.

SUMMARY

This disclosure provides a method and an apparatus for waking up a WUR terminal in a wireless network, to reduce air interface time and resource consumption of a radio access point and reduce network overheads.

To implement the foregoing objective, the following technical solutions are used in this disclosure.

According to a first aspect, this disclosure provides a method for waking up a WUR terminal in a wireless network, including: grouping, by a radio access point, at least one WUR terminal into at least one group according to a grouping rule; allocating, by the radio access point, a group identifier to each of the at least one group; sending, by the radio access point, a corresponding group identifier to each of the at least one WUR terminal; and sending, by the radio access point, a WUR wake-up packet including a group identifier of a target group, to attempt to wake up all WUR terminals in the target group.

In this disclosure, the radio access point groups WUR terminals and wakes up all WUR terminals in one group by sending one wake-up packet, to wake up a plurality of WUR terminals at a time. The radio access point does not need to send the wake-up packet to each WUR terminal in sequence, thereby reducing a quantity of wake-up packets sent by the radio access point, reducing air interface time and saving resources of the radio access point, and reducing network overheads. In addition, the radio AP may group the WUR terminals in any manner. This can meet a plurality of user requirements and has wide application scenarios.

With reference to the first aspect, in a first implementation of the first aspect, the grouping, by a radio access point, at least one WUR terminal into at least one group according to a grouping rule includes: grouping, by the radio access point, the at least one WUR terminal into the at least one group based on the grouping rule and a feature of the at least one WUR terminal, where the feature includes at least one of the following: a type of the corresponding WUR terminal, an identifier of the corresponding WUR terminal, and a time at which the corresponding WUR terminal is associated with the radio access point.

According to a second aspect, this disclosure provides a method for waking up a WUR terminal in a wireless network. The WUR terminal includes a main RF circuit and a WUR RF circuit, and the method includes: receiving, by the main RF circuit, a group identifier of a group to which the WUR terminal belongs; sending, by the main RF circuit, the group identifier of the group to which the WUR terminal belongs to the WUR RF circuit; receiving, by the WUR RF circuit, a WUR wake-up packet, where the wake-up packet includes a group identifier of a target group; and waking up, by the WUR RF circuit, the WUR terminal when the group identifier of the target group is the group identifier of the group to which the WUR terminal belongs.

According to a third aspect, this disclosure provides a method for waking up a WUR terminal in a wireless network, including: sending, by a radio access point, a WUR wake-up packet including at least one grouping standard, to attempt to wake up all WUR terminals meeting the at least one grouping standard.

In this disclosure, the radio access point wakes up, by using the WUR wake-up packet, the WUR terminals meeting the grouping standard in the WUR wake-up packet, to wake up a plurality of WUR terminals at a time. The radio access point does not need to send the wake-up packet to each WUR terminal in sequence, thereby reducing a quantity of wake-up packets sent by the radio access point, reducing air interface time and saving resources of the radio access point, and reducing network overheads. In addition, the radio AP does not need to interact with the WUR terminal, and a WUR RF circuit may determine, based on the grouping standard in the WUR wake-up packet, whether need to wake up the WUR terminal. An implementation process is simple.

With reference to the third aspect, in a first implementation of the third aspect, the at least one grouping standard includes at least one of the following: a type of a WUR terminal, duration for which a WUR terminal is in a sleep state, a location range of a WUR terminal, identifiers of a plurality of WUR terminals, an identifier of a radio access point associated with a WUR terminal, and a parameter set associated with a WUR terminal, where the parameter set includes an identifier of a radio access point associated with the WUR terminal and association duration.

According to a fourth aspect, this disclosure provides a method for waking up a WUR terminal in a wireless network, including: receiving, by a WUR RF circuit of the WUR terminal, a WUR wake-up packet, where the WUR wake-up packet includes at least one grouping standard; and waking up, by the WUR RF circuit, the WUR terminal when the WUR RF circuit determines that the WUR terminal meets the at least one grouping standard.

With reference to the fourth aspect, in a first implementation of the fourth aspect, the at least one grouping standard includes at least one of the following: a type of a WUR terminal, duration for which a WUR terminal is in a sleep state, a location range of a WUR terminal, identifiers of a plurality of WUR terminals, an identifier of a radio access point associated with a WUR terminal, and a parameter set associated with a WUR terminal, where the parameter set includes an identifier of a radio access point associated with the WUR terminal and association duration.

With reference to any one of the fourth aspect or the foregoing implementation, in a second implementation of the fourth aspect, the waking up, by the WUR RF circuit, the WUR terminal when the WUR RF circuit determines that the WUR terminal meets the at least one grouping standard includes: waking up, by the WUR RF circuit, the WUR terminal when an attribute, of the WUR terminal, corresponding to the at least one grouping standard meets the at least one grouping standard.

With reference to any one of the fourth aspect or the foregoing implementations, in a third implementation of the fourth aspect, the at least one grouping standard includes a space range of a WUR terminal, and the attribute, of the WUR terminal, corresponding to the at least one grouping standard includes a location of the WUR terminal; before the waking up, by the WUR RF circuit, the WUR terminal, the method further includes: obtaining, by the WUR RF circuit, the location of the WUR terminal, where the location of the WUR terminal is obtained by a locating apparatus of the WUR terminal; and the waking up, by the WUR RF circuit, the WUR terminal when an attribute, of the WUR terminal, corresponding to the at least one grouping standard meets the at least one grouping standard includes: waking up, by the WUR RF circuit, the WUR terminal when the location of the WUR terminal is within the location range.

In an Internet of Things scenario, there are many cases in which the WUR terminal moves. In the implementation, the radio AP may not consider a location to which the WUR terminal moves, and the grouping standard in the WUR wake-up packet is used to indicate an attempt to wake up a WUR terminal within a location range. Operations are convenient, and an implementation process is simple.

With reference to any one of the fourth aspect or the foregoing implementations, in a fourth implementation of the fourth aspect, the at least one grouping standard includes the identifier of the radio access point, and the attribute, of the WUR terminal, corresponding to the at least one grouping standard includes an identifier of a radio access point associated with the WUR terminal; before the waking up, by the WUR RF circuit, the WUR terminal, the method further includes: receiving, by the WUR RF circuit, the identifier that is of the radio access point associated with the WUR terminal and that is sent by a main RF circuit of the WUR terminal; and the waking up, by the WUR RF circuit, the WUR terminal when an attribute, of the WUR terminal, corresponding to the at least one grouping standard meets the at least one grouping standard includes: waking up, by the WUR RF circuit, the WUR terminal when the identifier of the radio access point associated with the WUR terminal is consistent with the identifier of the radio access point that is in the WUR wake-up packet.

In this implementation, the radio AP may wake up, at a time by using the WUR wake-up packet, all WUR terminals associated with the radio AP. Operations are convenient, and an implementation process is simple.

According to a fifth aspect, this disclosure provides an apparatus for waking up a WUR terminal in a wireless network, including: a grouping unit configured to group at least one WUR terminal into at least one group according to a grouping rule; an allocation unit configured to allocate a group identifier to each of the at least one group; and a sending unit configured to send a corresponding group identifier to each of the at least one WUR terminal, where the sending unit is further configured to send a WUR wake-up packet including a group identifier of a target group, to attempt to wake up all WUR terminals in the target group.

With reference to the fifth aspect, in a first implementation of the fifth aspect, the grouping unit is further configured to group the at least one WUR terminal into the at least one group based on the grouping rule and a feature of the at least one WUR terminal, where the feature includes at least one of the following: a type of the corresponding WUR terminal, an identifier of the corresponding WUR terminal, and a time at which the corresponding WUR terminal is associated with the radio access point.

According to a sixth aspect, this disclosure provides a WUR terminal, including a main RF circuit and a WUR RF circuit, where the main RF circuit is configured to receive a group identifier of a group to which the WUR terminal belongs; the main RF circuit is further configured to send the group identifier of the group to which the WUR terminal belongs to the WUR RF circuit; the WUR RF circuit is configured to receive a WUR wake-up packet, where the wake-up packet includes a group identifier of a target group; and the WUR RF circuit is further configured to wake up the WUR terminal when the group identifier of the target group is the group identifier of the group to which the WUR terminal belongs.

According to a seventh aspect, this disclosure provides an apparatus for waking up a WUR terminal in a wireless network, including: a sending unit configured to send a wake-up radio WUR wake-up packet including at least one grouping standard, to attempt to wake up all WUR terminals meeting the at least one grouping standard.

With reference to the seventh aspect, in a first implementation of the seventh aspect, the at least one grouping standard includes at least one of the following: a type of a WUR terminal, duration for which a WUR terminal is in a sleep state, a location range of a WUR terminal, identifiers of a plurality of WUR terminals, an identifier of a radio access point associated with a WUR terminal, and a parameter set associated with a WUR terminal, where the parameter set includes an identifier of a radio access point associated with the WUR terminal and association duration.

According to an eighth aspect, this disclosure provides a WUR terminal, including a WUR RF circuit, where the WUR RF circuit is configured to receive a wake-up packet, where the wake-up packet includes at least one grouping standard; and the WUR RF circuit is further configured to wake up the WUR terminal when the WUR RF circuit determines that the WUR terminal meets the at least one grouping standard.

With reference to the eighth aspect, in a first implementation of the eighth aspect, the at least one grouping standard includes at least one of the following: a type of a WUR terminal, duration for which a WUR terminal is in a sleep state, a location range of a WUR terminal, identifiers of a plurality of WUR terminals, an identifier of a radio access point associated with a WUR terminal, and a parameter set associated with a WUR terminal, where the parameter set includes an identifier of a radio access point associated with the WUR terminal and association duration.

With reference to any one of the eighth aspect or the foregoing implementation, in a second implementation of the eighth aspect, the WUR RF circuit is further configured to wake up the WUR terminal when an attribute, of the WUR terminal, corresponding to the at least one grouping standard meets the at least one grouping standard.

With reference to any one of the eighth aspect or the foregoing implementations, in a third implementation of the eighth aspect, the at least one grouping standard includes a space range of a WUR terminal, and the attribute, of the WUR terminal, corresponding to the at least one grouping standard includes a location of the WUR terminal; the WUR RF circuit is further configured to obtain the location of the WUR terminal, where the location of the WUR terminal is obtained by a locating apparatus of the WUR terminal; and the WUR RF circuit is further configured to wake up the WUR terminal when the location of the WUR terminal is within the location range.

With reference to any one of the eighth aspect or the foregoing implementations, in a fourth implementation of the eighth aspect, the at least one grouping standard includes the identifier of the radio access point, and the attribute, of the WUR terminal, corresponding to the at least one grouping standard includes an identifier of a radio access point associated with the WUR terminal; the WUR RF circuit is further configured to receive the identifier that is of the radio access point associated with the WUR terminal and that is sent by a main RF circuit of the WUR terminal; and the WUR RF circuit is further configured to wake up the WUR terminal when the identifier of the radio access point associated with the WUR terminal is consistent with the identifier of the radio access point that is in the wake-up packet.

According to a ninth aspect, this disclosure provides a radio access point, including a processor and a transceiver, where the processor is configured to group at least one WUR terminal into at least one group according to a grouping rule; the processor is further configured to allocate a group identifier to each of the at least one group; the processor is further configured to send a corresponding group identifier to each of the at least one WUR terminal by using the transceiver; and the processor is further configured to send, by using the transceiver, a WUR wake-up packet including a group identifier of a target group, to attempt to wake up all WUR terminals in the target group.

With reference to the ninth aspect, in a first implementation of the fifth aspect, the processor is further configured to group the at least one WUR terminal into the at least one group based on the grouping rule and a feature of the at least one WUR terminal, where the feature includes at least one of the following: a type of the corresponding WUR terminal, an identifier of the corresponding WUR terminal, and a time at which the corresponding WUR terminal is associated with the radio access point.

According to a tenth aspect, this disclosure provides a radio access point, including a processor and a transceiver, where the processor is configured to send, by using the transceiver, a WUR wake-up packet including at least one grouping standard, to attempt to wake up all WUR terminals meeting the at least one grouping standard.

With reference to the tenth aspect, in a first implementation of the tenth aspect, the at least one grouping standard includes at least one of the following: a type of a WUR terminal, duration for which a WUR terminal is in a sleep state, a location range of a WUR terminal, identifiers of a plurality of WUR terminals, an identifier of a radio access point associated with a WUR terminal, and a parameter set associated with a WUR terminal, where the parameter set includes an identifier of a radio access point associated with the WUR terminal and association duration.

According to an eleventh aspect, this disclosure provides a computer-readable storage medium. The computer-readable storage medium stores an instruction. When the instruction is run on a computer, the computer is enabled to perform the method for waking up a WUR terminal in a wireless network according to the first aspect.

According to a twelfth aspect, this disclosure provides a computer-readable storage medium. The computer-readable storage medium stores an instruction. When the instruction is run on a computer, the computer is enabled to perform the method for waking up a WUR terminal in a wireless network according to the third aspect.

BRIEF DESCRIPTION OF DRAWINGS

To describe the technical solutions in the embodiments of the present disclosure more clearly, the following briefly describes the accompanying drawings for describing the embodiments of the present disclosure.

DESCRIPTION OF EMBODIMENTS

To make the objectives, technical solutions, and benefits of the embodiments of the present disclosure clearer, this disclosure is described in detail below with reference to the accompanying drawings and embodiments.

In the Internet of Things, many WLAN devices need to be powered by batteries. The WLAN devices may enter a sleep state to reduce power consumption of the devices and prolong usage time (battery lifespans) of the devices. However, even if a terminal device is in the sleep state, the terminal device frequently enters an awake state from the sleep state to receive data of another WLAN device (for example, a radio access point (AP)) or another type of device using a WLAN). A longer time in which the terminal device stays in the sleep state indicates lower energy consumption. However, if the terminal device is in the sleep state for a long time, timeliness of data transmission is reduced.

To reduce power consumption of a WLAN device as much as possible and meet a requirement on timeliness of data transmission, in addition to a main RF) circuit, a dedicated WUR RF circuit may be disposed in the WLAN device. The WLAN device provided with the WUR RF circuit is referred to as a WUR terminal or a terminal device.

The WUR RF circuit has a capability of receiving only a radio signal and cannot send a radio signal. Therefore, the WUR RF circuit is also referred to as a wake-up receiver (WURx). The WUR RF circuit is configured to receive only a frame (which may be referred to as a WUR frame or a wake-up packet, for example, a WUR beacon frame, a WUR wake-up frame, or a WUR wake-up packet) related to a wake-up operation, and ignore another frame (for example, a data frame). Therefore, power consumption and complexity of the WUR RF circuit are low. The power consumption of the WUR RF circuit during working may be less than 100 microwatts (µW). The main RF circuit and the WUR RF circuit may be independent, or may be integrated into one chip.

When no data is transmitted, the WUR terminal is in the sleep state. When the WUR terminal is in the sleep state, the main RF circuit is disconnected to save energy. When the WUR terminal is in the sleep state, the WUR RF circuit is in a working state, to timely receive a wake-up packet sent by another WLAN device such as a radio access point. Optionally, the WUR RF circuit may suspend working to further save energy. For example, the WUR RF circuit may periodically suspend working. Further, when the WUR terminal is in the sleep state, any component other than the WUR RF circuit in the entire WUR terminal may be in a power-off state. If the WUR terminal includes a volatile memory, the volatile memory may not be in the power-off state when the WUR terminal is in the sleep state. Alternatively, the WUR terminal may copy content in the volatile memory to a non-volatile memory before entering the sleep state, and then disable the volatile memory when entering the sleep state.

When needing to send data to the WUR terminal, or needing to query data of the WUR terminal, the WLAN device may send a wake-up packet first. After receiving the wake-up packet, the WUR RF circuit of the WUR terminal to be woken up wakes up the main RF circuit of the WUR terminal. In this case, the WUR terminal is in the awake state. The WLAN device further sends a WLAN frame after sending the wake-up packet. The WLAN frame may be a data frame or a management frame. The data frame may include data or an instruction for querying data of the terminal device that is sent by the WLAN device to the terminal device.

Figure 1:
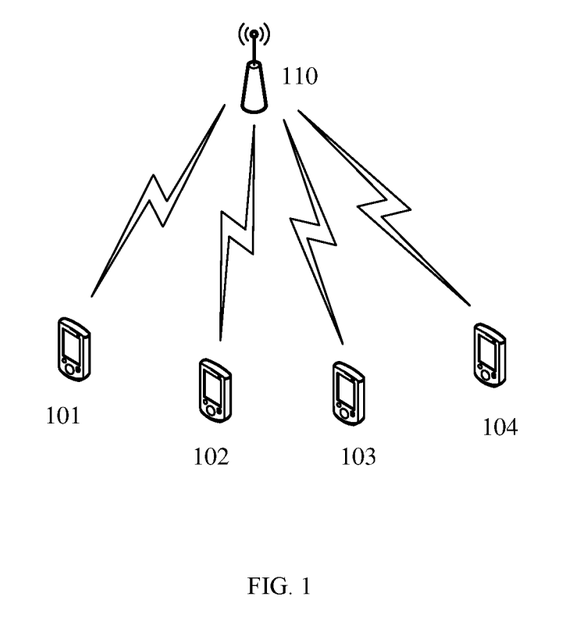
FIG. 1 is a schematic diagram of a network architecture according to an embodiment of the present disclosure.

An example in which the WLAN device is a radio AP is used. The embodiments of the present disclosure are applicable to a scenario in which the radio AP wakes up a WUR terminal in a wireless network. FIG. 1 is a schematic diagram of a network architecture to which the embodiments of the present disclosure are applicable. In the network architecture shown in FIG. 1, a radio AP 110 may be wirelessly connected to a plurality of WUR terminals. FIG. 1 shows only four WUR terminals: a WUR terminal 101, a WUR terminal 102, a WUR terminal 103, and a WUR terminal 104. The radio AP may include a transceiver and a processor. The processor can process data, and can send and receive a radio signal by using the transceiver, for example, send a WUR wake-up packet to a WUR terminal. The WUR terminal includes a main RF circuit and a WUR RF circuit. For functions of the WUR terminal, refer to the foregoing related description. Currently, when needing to wake up a plurality of WUR terminals (for example, the WUR terminal 101, the WUR terminal 102, the WUR terminal 103, and the WUR terminal 104), the radio AP 110 sends a wake-up packet to each WUR terminal in sequence. Consequently, a large amount of air interface time and a large quantity of resources of the radio AP 110 are consumed, and network overheads are increased. However, in the embodiments of the present disclosure, the radio AP 110 may wake up a plurality of WUR terminals by sending one WUR wake-up packet, thereby decreasing a quantity of WUR wake-up packets sent by the radio AP 110, reducing air interface time and saving resources of the radio AP 110, and reducing network overheads.

Figure 2:
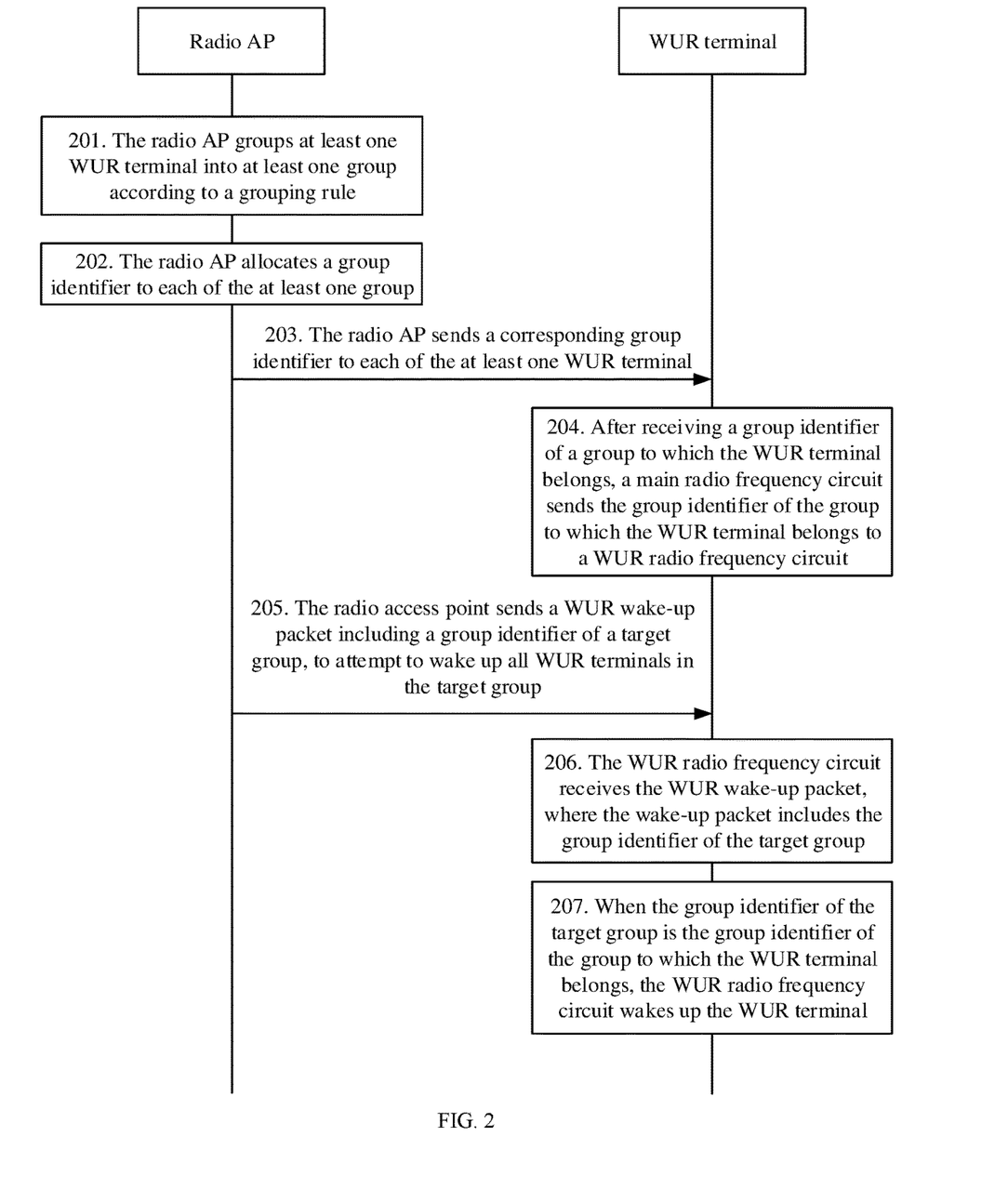
FIG. 2 is a schematic flowchart of a method for waking up a WUR terminal in a wireless network according to an embodiment of the present disclosure.

FIG. 2 is a schematic flowchart of a method for waking up a WUR terminal in a wireless network according to an embodiment of the present disclosure.

An embodiment of the present disclosure provides a method for waking up a WUR terminal in a wireless network. The method may be applied to the network architecture shown in FIG. 1. As shown in FIG. 2, the method includes the following steps 201 to 207.

201. A radio AP groups at least one WUR terminal into at least one group according to a grouping rule.

The at least one WUR terminal indicates one or more WUR terminals to be grouped by the radio AP. When the radio AP is associated with the at least one WUR terminal, to avoid sending a WUR wake-up packet to each WUR terminal in sequence when waking up the at least one WUR terminal, the at least one WUR terminal is grouped, so that all WUR terminals in a group may be woken up by sending the WUR wake-up packet once.

In this embodiment of the present disclosure, the grouping rule may be preset. The grouping rule may be set for a feature of the at least one WUR terminal. Therefore, the radio AP may group the at least one WUR terminal into the at least one group based on the feature of the at least one WUR terminal and the grouping rule. The grouping rule may alternatively be set in another manner. For example, the at least one WUR terminal is randomly grouped; or after a user groups the at least one WUR terminal, a correspondence between each group and each WUR terminal is configured to the radio AP as the grouping rule.

The feature of the at least one WUR terminal may include at least one of the following: a type of the corresponding WUR terminal, an identifier of the corresponding WUR terminal, and a time at which the corresponding WUR terminal is associated with the radio access point.

Various parameters included in the feature of the at least one WUR terminal may be obtained by the radio AP when the radio AP is associated with the WUR terminal or performs data transmission with the WUR terminal.

When the grouping rule is set based on the identifier of the corresponding WUR terminal, the grouping rule may be set as grouping every M (M is an integer greater than 1) WUR terminals into one group in an ascending order of identifiers of WUR terminals. For example, in the network architecture shown in FIG. 1, an identifier of the WUR terminal 101 is 101, an identifier of the WUR terminal 102 is 102, an identifier of the WUR terminal 103 is 103, and an identifier of the WUR terminal 104 is 104. In this case, the grouping rule may be grouping every two identifiers into one group in an ascending order of the identifiers. In this case, the radio AP may sort the identifiers of the WUR terminals in an ascending order, and then group the WUR terminals in a manner in which every two identifiers are grouped into one group. A result of the division is: The WUR terminal 101 and the WUR terminal 102 are in a group, and the WUR terminal 103 and the WUR terminal 104 are in a group.

When the grouping rule is set based on the type of the corresponding WUR terminal, the grouping rule may be set as grouping WUR terminals of a same type into one group. In this case, the radio AP may group WUR terminals of a same type into one group. When the grouping rule is set based on the time at which the corresponding WUR terminal is associated with the radio access point, the grouping rule may be set as grouping every M WUR terminals into one group based on an order of association times. In this case, the radio AP may group every M WUR terminals into one group based on an order of association times at which the WUR terminals are associated with the radio AP.

When the radio AP groups the at least one WUR terminal, only one group may be grouped. For example, when the grouping rule is grouping every 50 WUR terminals into one group based on the order of association times, and there are only 40 WUR terminals associated with the radio AP, the radio AP groups, according to the grouping rule, the 40 WUR terminals associated with the radio AP into one group.

202. The radio AP allocates a group identifier to each of the at least one group.

After the radio AP groups the WUR terminals, the radio AP may allocate the group identifier to each group. The group identifier is used to uniquely identify the corresponding group, to distinguish between each group. The group identifier may be a character string of any length, including a digit, a letter, a symbol, and the like. For example, the group identifier may be encoded by using an 8-bit Unicode Transformation Format (UTF-8).

In step 201 and step 202, the radio AP may group the at least one WUR terminal into the at least one group, and store the group identifier allocated to each group, so that the WUR terminal queries the radio AP for a group identifier of a group to which the WUR terminal belongs, and so on.

203. The radio AP sends a corresponding group identifier to each of the at least one WUR terminal.

After allocating the group identifier to each group, the radio AP sends, to each WUR terminal, the group identifier of the group to which each WUR terminal belongs, so that when in a sleep state, the WUR terminal may determine, based on the group identifier of the group to which the WUR terminal belongs, whether the WUR terminal needs to be woken up.

In this embodiment of the present disclosure, when sending the group identifier to a main RF circuit of the WUR terminal, the radio AP may send the group identifier by using an association response message or a data frame that is sent to the WUR terminal.

204. After receiving the group identifier of the group to which the WUR terminal belongs, the main RF circuit sends the group identifier of the group to which the WUR terminal belongs to a WUR RF circuit.

The WUR RF circuit in the WUR terminal is configured to receive only a frame related to a wake-up operation. Therefore, the WUR terminal receives, by using the main RF circuit, the group identifier sent by the radio AP. In this case, the WUR terminal still does not enter the sleep state. After receiving the group identifier of the group to which the WUR terminal belongs, the main RF circuit may send the group identifier of the group to which the WUR terminal belongs to the WUR RF circuit, so that when receiving a WUR wake-up packet, the WUR RF circuit may determine, by comparing the group identifier of the group to which the WUR terminal belongs with a group identifier in the WUR wake-up packet, whether need to wake up the WUR terminal.

The main RF circuit may directly send the group identifier to the WUR RF circuit. The main RF circuit may alternatively send the group identifier to a central processing unit (CPU), and then the CPU sends the group identifier to the WUR RF circuit.

205. The radio access point sends a WUR wake-up packet including a group identifier of a target group, to attempt to wake up all WUR terminals in the target group.

After a WUR terminal enters the sleep state, the radio AP needs to wake up the WUR terminal to transmit data to the WUR terminal. To avoid sending the WUR wake-up packet to each WUR terminal in sequence to wake up the WUR terminal, the radio access point may attempt to wake up, by sending the wake-up packet once to each group, all WUR terminals in the group.

In this step, the target group is a group that the WUR wake-up packet attempts to wake up this time. In step 202, the group identifier is allocated to each group. Therefore, adding a group identifier into the WUR wake-up packet indicates an attempt to wake up all WUR terminals in the group corresponding to the group identifier this time.

The radio AP may determine, according to a received instruction, a group that the radio AP attempts to wake up, or may determine, based on a requirement of an actual scenario, a group that the radio AP attempts to wake up. For example, the radio access point may receive an instruction sent by an external server. The instruction indicates a group needing to be woken up. The radio AP uses, as the target group, the group that is indicated in the received instruction and that needs to be woken up.

A field used to store the group identifier of the target group may be defined in the WUR wake-up packet, and a quantity of bytes of the field may be set based on a length of the group identifier.

206. The WUR RF circuit receives the WUR wake-up packet, where the wake-up packet includes the group identifier of the target group.

When the WUR terminal is in the sleep state, the WUR RF circuit works. Therefore, the WUR RF circuit in the WUR terminal receives the WUR wake-up packet sent by the radio AP. The WUR wake-up packet includes the group identifier of the target group, indicating the group to which the WUR terminal to be woken up by the WUR wake-up packet this time belongs.

207. When the group identifier of the target group is the group identifier of the group to which the WUR terminal belongs, the WUR RF circuit wakes up the WUR terminal.

After receiving the group identifier sent by the main RF circuit in step 204, the WUR RF circuit stores the group identifier. In this step, after receiving the WUR wake-up packet, the WUR RF circuit may determine, by comparing the group identifier in the WUR wake-up packet with the group identifier sent by the main RF circuit, whether to wake up the WUR terminal.

A manner in which the WUR RF circuit compares the group identifier in the WUR wake-up packet with the group identifier sent by the main RF circuit may be determining whether the group identifier in the WUR wake-up packet and the group identifier sent by the main RF circuit are the same, in other words, whether the group identifier of the target group is the group identifier of the group to which the WUR terminal belongs. If the group identifier of the target group is the group identifier of the group to which the WUR terminal belongs, it indicates that the group currently woken up by the radio AP is the group to which the WUR terminal belongs. Therefore, the WUR RF circuit wakes up the WUR terminal. If the group identifier of the target group is not the group identifier of the group to which the WUR terminal belongs, it indicates that the group currently woken up by the radio AP is not the group to which the WUR terminal belongs. In other words, the radio AP does not wake up a WUR terminal in the group to which the WUR terminal belongs. Therefore, the WUR RF circuit does not need to wake up the WUR terminal.

After the WUR RF circuit wakes up the WUR terminal, the WUR terminal enters a working state, components such as the main RF circuit start to work, and the WUR terminal may perform data transmission with the radio AP.

In this embodiment of the present disclosure, the radio access point groups the WUR terminals, allocates the group identifier of each group, and then sends the corresponding group identifier to each WUR terminal. When needing to wake up a WUR terminal, the radio access point sends the WUR wake-up packet including the group identifier of the target group, to attempt to wake up all WUR terminals in the target group, so that a WUR terminal that is in WUR terminals receiving the wake-up packet and whose group identifier is the same as the group identifier in the WUR wake-up packet is woken up, to wake up a plurality of WUR terminals at a time. The radio access point does not need to send the WUR wake-up packet to each WUR terminal in sequence, thereby reducing a quantity of wake-up packets sent by the radio access point, reducing air interface time and saving resources of the radio access point, and reducing network overheads. In addition, in this embodiment of the present disclosure, the radio AP may group the WUR terminals in any manner. This can meet a plurality of user requirements and has wide application scenarios.

Figure 3:
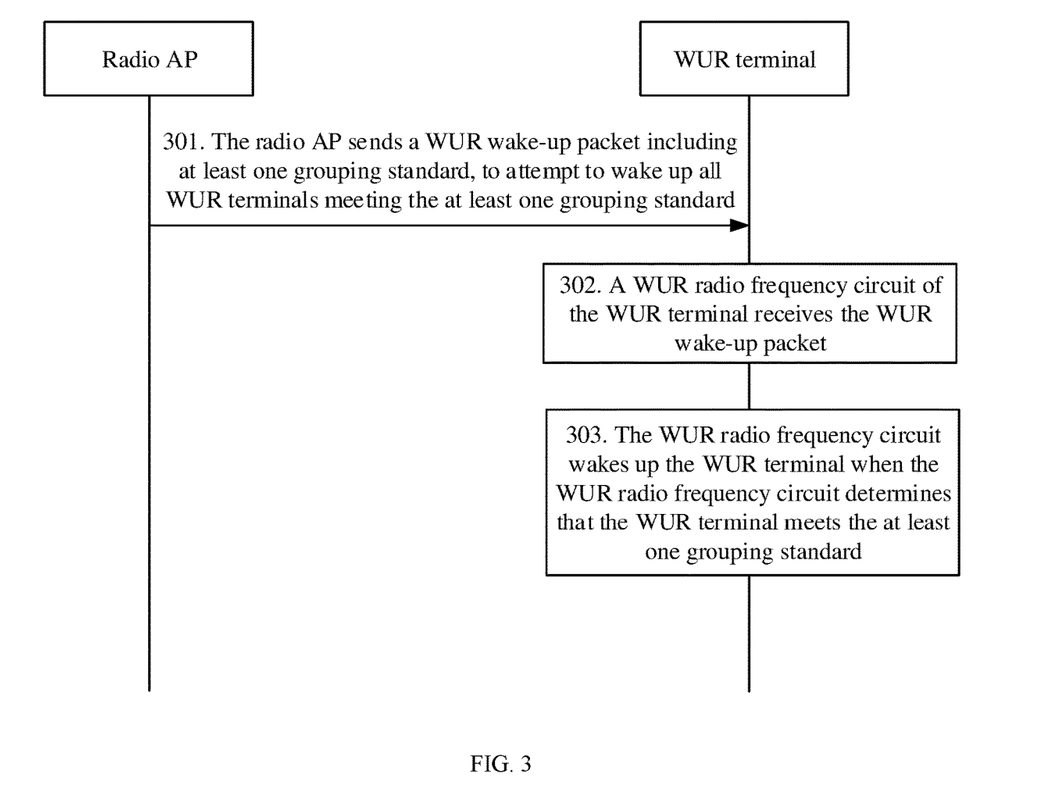
FIG. 3 is a schematic flowchart of a method for waking up a WUR terminal in a wireless network according to another embodiment of the present disclosure.

FIG. 3 is a schematic flowchart of a method for waking up a WUR terminal in a wireless network according to another embodiment of the present disclosure.

Another embodiment of the present disclosure provides a method for waking up a WUR terminal in a wireless network. The method may be applied to the network architecture shown in FIG. 1. As shown in FIG. 3, the method includes the following steps 301 to 303.

301. A radio AP sends a WUR wake-up packet including at least one grouping standard, to attempt to wake up all WUR terminals meeting the at least one grouping standard.

The grouping standard indicates a standard to be met by the WUR terminals that the radio AP attempts to wake up. When sending the WUR wake-up packet, the radio AP may add the grouping standard into the WUR wake-up packet, to enable a WUR terminal receiving the WUR wake-up packet to determine, based on the grouping standard, whether need to be woken up. There may be one or more (including two) grouping standards in the WUR wake-up packet. When the WUR wake-up packet includes a plurality of grouping standards, it indicates that the WUR terminals to be woken up this time needs to meet the plurality of grouping standards in the WUR wake-up packet.

In this embodiment of the present disclosure, the grouping standard may be set based on an attribute of the WUR terminal. Specifically, the grouping standard may include at least one of the following: a type of a WUR terminal, duration for which a WUR terminal is in a sleep state, a location range of a WUR terminal, identifiers of a plurality of WUR terminals, an identifier of a radio access point associated with a WUR terminal, and a parameter set associated with a WUR terminal, where the parameter set includes an identifier of a radio access point associated with the WUR terminal and association duration.

302. A WUR RF circuit of a WUR terminal receives the WUR wake-up packet.

The WUR wake-up packet includes the at least one grouping standard. When the WUR terminal is in the sleep state, the WUR RF circuit of the WUR terminal is in a working state, and may receive the WUR wake-up packet. The WUR wake-up packet includes the at least one grouping standard. The WUR RF circuit of the WUR terminal may determine, based on the at least one grouping standard included in the WUR wake-up packet, whether to wake up the WUR terminal.

303. When the WUR RF circuit determines that the WUR terminal meets the at least one grouping standard, the WUR RF circuit wakes up the WUR terminal.

The WUR RF circuit determines, by determining whether the WUR terminal meets the at least one grouping standard, whether the WUR terminal is a WUR terminal that the radio AP that sends the WUR wake-up packet attempts to wake up. When the WUR terminal meets the at least one grouping standard, the WUR terminal is determined to be the WUR terminal that the radio AP that sends the WUR wake-up packet attempts to wake up. Therefore, the WUR terminal is woken up, so that the WUR terminal may perform data transmission with the radio AP. When the WUR terminal cannot meet the at least one grouping standard, the WUR terminal is determined not to be the WUR terminal that the radio AP that sends the WUR wake-up packet attempts to wake up. Therefore, the WUR terminal does not need to be woken up. That the WUR terminal meets the at least one grouping standard means that when the WUR wake-up packet includes one grouping standard, the WUR terminal meets the grouping standard included in the WUR wake-up packet; or when the WUR wake-up packet includes a plurality of grouping standards, the WUR terminal meets the plurality of the grouping standards included in the WUR wake-up packet.

In this embodiment of the present disclosure, the grouping standard may be set based on the attribute of the WUR terminal. When determining that the WUR terminal meets the at least one grouping standard, the WUR RF circuit may determine, based on the attribute, of the WUR terminal, corresponding to the at least one grouping standard, whether the WUR terminal meets the at least one grouping standard.

In this embodiment of the present disclosure, the WUR RF circuit determines, based on the attribute, of the WUR terminal, corresponding to the at least one grouping standard, whether the WUR terminal meets the at least one grouping standard. Therefore, the WUR RF circuit needs to determine, before determining whether the WUR terminal meets the at least one grouping standard, the attribute, of the WUR terminal, corresponding to the at least one grouping standard. A manner in which the WUR RF circuit determines the attribute, of the WUR terminal, corresponding to the at least one grouping standard is not limited, and may be pre-storing, or may be obtaining from another module.

For example, the grouping standard may include the duration for which the WUR terminal is in the sleep state. For example, the radio AP attempts to wake up a WUR terminal that is in the sleep state for duration of 10 minutes. In this case, the radio AP may set, to 10 minutes, a value of a field that indicates duration of the sleep state and that is in the WUR wake-up packet. After receiving the WUR wake-up packet, the WUR RF circuit determines, by reading the value of the field that indicates the duration of the sleep state and that is in the WUR wake-up packet, that the radio AP needs to wake up the WUR terminal that is in the sleep state for the duration of 10 minutes. In this case, the attribute, of the WUR terminal, corresponding to the at least one grouping standard is the duration for which the WUR terminal is in the sleep state. Therefore, the WUR RF circuit may compare 10 minutes with the duration for which the WUR terminal is in the sleep state. If the duration for which the WUR terminal is in the sleep state is equal to 10 minutes, it indicates that the WUR terminal belongs to the WUR terminals that the radio AP attempts to wake up. Therefore, the WUR RF circuit wakes up the WUR terminal.

In the foregoing example, the WUR RF circuit may store, when the WUR terminal enters the sleep state, a time at which the WUR terminal enters the sleep state, and determines, when receiving the WUR wake-up packet, the duration for which the WUR terminal is in the sleep state by using a current time and the recorded time at which the WUR terminal enters the sleep state.

For another example, the grouping standard may include the location range of the WUR terminal. For example, the radio AP attempts to wake up a WUR terminal located within coverage of a circle with center A and radius R. The radio AP may add, to a field that indicates the location range and that is in the WUR wake-up packet, a parameter indicating the coverage of the circle with center A and radius R. After receiving the WUR wake-up packet, the WUR RF circuit determines, by reading the field that indicates the location range and that is in the WUR wake-up packet, that the radio AP needs to wake up the WUR terminal located within the coverage of the circle with center A and radius R. In this case, the attribute, of the WUR terminal, corresponding to the at least one grouping standard is a location of the WUR terminal. Therefore, the WUR RF circuit may obtain the location of the WUR terminal, and then determine whether the location of the WUR terminal is within the coverage of the circle with center A and radius R. If the location of the WUR terminal is within the coverage of the circle with center A and radius R, it indicates that the WUR terminal belongs to the WUR terminals that the radio AP attempts to wake up. Therefore, the WUR RF circuit wakes up the WUR terminal.

When the grouping standard may include the location range of the WUR terminal, the WUR wake-up packet includes the parameter indicating the location range. For example, if the location range is the coverage of the circle with center A and radius R, it indicates that the parameter indicating the location range may be radius R and coordinates of center A. A locating apparatus may be disposed in the WUR terminal. When the WUR RF circuit needs to obtain the location of the WUR terminal, the locating apparatus obtains the location of the WUR terminal, and the WUR RF circuit then obtains the location of the WUR terminal from the locating apparatus. The locating apparatus is configured to obtain the location of the WUR terminal, and may use an application having a locating function, such as a Global Positioning System (GPS).

In an Internet of Things scenario, many WUR terminals are in a movable state. For example, in a scenario of a pasture in which a WUR terminal is used to track an animal in the pasture, the animal may move in real time. In this case, when the radio AP needs to obtain data of an animal in a certain location range, a specific moving manner and a moving route of the animal may not be considered. A location range of a WUR terminal that the radio AP attempts to wake up is indicated by using the grouping standard in the WUR wake-up packet. Therefore, after receiving the WUR wake-up packet, all WUR terminals in the range may be woken up. Operations are convenient, and an implementation process is simple.

For another example, the grouping standard may include the identifier of the radio AP associated with the WUR terminal. When the radio AP attempts to wake up a WUR terminal associated with the radio AP, the radio AP may add an identifier of the radio AP into the WUR wake-up packet. The WUR terminal is a low power consumption device. To meet a low power consumption requirement on the WUR terminal, the WUR wake-up packet received by the WUR RF circuit usually has a simple structure and a relatively short length. However, the identifier of the radio AP is usually a medium access control (MAC) address. A length of the MAC address is usually 48 bits. Therefore, if the radio AP adds a MAC address of the radio AP into the WUR wake-up packet as the identifier of the radio AP, the length of the WUR wake-up packet is excessively long. In this case, the WUR RF circuit consumes relatively much energy to receive and process the WUR wake-up packet, thereby increasing power consumption of the WUR terminal. Therefore, in this embodiment of the present disclosure, to reduce power consumption of the WUR RF circuit, a short identifier that can uniquely identify the radio AP may be determined based on the MAC address of the radio AP. When the radio AP attempts to wake up the WUR terminal associated with the radio AP, the short identifier of the radio AP is added into the WUR wake-up packet. In this way, the WUR RF circuit may store the identifier of the radio AP associated with the WUR terminal. After receiving the WUR wake-up packet, the WUR RF circuit determines whether the identifier of the radio AP associated with the WUR terminal is consistent with the short identifier in the WUR wake-up packet. If the WUR RF circuit stores the short identifier of the radio AP associated with the WUR terminal, the WUR RF circuit may directly compare the stored short identifier with the short identifier in the WUR wake-up packet, to determine whether the two identifiers are the same. If the WUR RF circuit stores the MAC address of the radio AP associated with the WUR terminal, the WUR RF circuit may first derive the short identifier by using the MAC address, and then compare the derived short identifier with the short identifier in the WUR wake-up packet, to determine whether the two identifiers are the same. When a determining result is that the two identifiers are the same, it indicates that the WUR terminal belongs to the WUR terminals that the radio AP attempts to wake up. Therefore, the WUR RF circuit wakes up the WUR terminal. In this way, the radio AP wakes up all WUR terminals associated with the radio AP at a time by using the WUR wake-up packet. Operations are convenient, and an implementation process is simple.

The WUR RF circuit may obtain, from the main RF circuit before the WUR terminal enters the sleep state, the short identifier of the radio AP associated with the WUR terminal, and then store the short identifier of the radio AP associated with the WUR terminal. Alternatively, the WUR RF circuit may obtain, from the main RF circuit before the WUR terminal enters the sleep state, the MAC address of the radio AP associated with the WUR terminal, so that after receiving the WUR wake-up packet, the WUR RF circuit first determines the short identifier based on the MAC address, and then compares the determined short identifier with the short identifier in the WUR wake-up packet.

When the grouping standard includes the identifier of the radio AP associated with the WUR terminal, a flag bit may be set in the WUR wake-up packet, and is used to indicate that the WUR wake-up packet attempts to wake up the WUR terminal associated with the radio AP this time. Alternatively, the short identifier of the radio AP may be stored in a field used to store a transmit end address in the WUR wake-up packet. After receiving the WUR wake-up packet, the WUR RF circuit may determine, based on the flag bit of the WUR wake-up packet, a standard of the WUR terminal that the WUR wake-up packet attempts to wake up this time. When determining that the WUR wake-up packet attempts to wake up the WUR terminal associated with the radio AP, the WUR RF circuit obtains the short identifier of the radio AP from the field of the transmit end address in the WUR wake-up packet. The radio AP may send the WUR wake-up packet in a broadcast manner. In this case, the WUR wake-up packet may not include a destination address. Alternatively, the radio AP may send the WUR wake-up packet in a multicast manner. In this case, a destination address of the WUR wake-up packet may be an address of a WUR terminal in the group.

For another example, the grouping standard may include the parameter set associated with the WUR terminal, to be specific, the identifier of the radio AP associated with the WUR terminal and the association duration. In this case, the radio AP may add a short identifier of the radio AP and the association duration such as 10 minutes into the WUR wake-up packet. After receiving the WUR wake-up packet, the WUR RF circuit determines, by reading the short identifier of the radio AP and a value of a field indicating the association duration that are in the WUR wake-up packet, that the radio AP needs to wake up a WUR terminal that is associated with the radio AP for 10 minutes. In this case, the attribute, of the WUR terminal, corresponding to the at least one grouping standard is the identifier of the radio AP associated with the WUR terminal and the association duration. Therefore, the WUR RF circuit may compare the identifier of the radio AP associated with the WUR terminal and the short identifier of the radio AP in the WUR wake-up packet, and determines whether the identifier of the radio AP associated with the WUR terminal is consistent with the short identifier of the radio AP in the WUR wake-up packet. When the two identifiers are consistent, the WUR RF circuit determines whether the duration for which the WUR terminal is associated with the radio AP is 10 minutes. If the duration for which the WUR terminal is associated with the radio AP is 10 minutes, it indicates that the WUR terminal belongs to the WUR terminals that the radio AP attempts to wake up. Therefore, the WUR RF circuit wakes up the WUR terminal.

The grouping standard may include the parameter set associated with the WUR terminal. The WUR RF circuit may store an association time and the identifier of the radio AP when the WUR terminal is associated with the radio AP. When receiving the WUR wake-up packet, the WUR RF circuit determines, by using a current time and the recorded association time, the duration for which the WUR terminal is associated with the radio AP. When the grouping standard includes the parameter set associated with the WUR terminal, a process in which the WUR RF circuit compares whether the short identifier in the WUR wake-up packet is consistent with the identifier of the radio AP associated with the WUR terminal is the same as a process in which the WUR RF circuit compares, when the grouping standard includes the identifier of the radio access point associated with the WUR terminal, whether the short identifier in the WUR wake-up packet is consistent with the identifier of the radio AP associated with the WUR terminal.

For another example, the grouping standard may include the identifiers of a plurality of WUR terminals. In this case, the radio AP may add, into the WUR wake-up packet, identifiers of a plurality of WUR terminals that the radio AP attempts to wake up. The WUR RF circuit pre-stores the identifier of the WUR terminal. After receiving the WUR wake-up packet, the WUR RF circuit compares the stored identifier of the WUR terminal with the identifier of the WUR terminal that is included in the WUR wake-up packet, to determine whether the WUR wake-up packet includes the identifier of the WUR terminal that is stored in the WUR RF circuit. If the WUR wake-up packet includes the identifier of the WUR terminal that is stored in the WUR RF circuit, it indicates that the WUR terminal belongs to the WUR terminals that the radio AP attempts to wake up. Therefore, the WUR RF circuit wakes up the WUR terminal.

For another example, the grouping standard includes the type of the WUR terminal. In this case, the radio AP may add, into the WUR wake-up packet, a type of a WUR terminal that the radio AP attempts to wake up. The WUR RF circuit pre-stores a type of the WUR terminal. After receiving the WUR wake-up packet, the WUR RF circuit compares the stored type of the WUR terminal with the type of the WUR terminal that is included in the WUR wake-up packet, and determines whether the type of the WUR terminal that is included in the WUR wake-up packet is the same as the type of the WUR terminal that is stored in the WUR RF circuit. If the type of the WUR terminal that is included in the WUR wake-up packet is the same as the type of the WUR terminal that is stored in the WUR RF circuit, it indicates that the WUR terminal belongs to the WUR terminals that the radio AP attempts to wake up. Therefore, the WUR RF circuit wakes up the WUR terminal.

In this embodiment of the present disclosure, when waking up the WUR terminal, the radio access point sends the WUR wake-up packet including the at least one grouping standard. After receiving the wake-up packet, the WUR RF circuit in the WUR terminal may determine, based on the at least one grouping standard included in the WUR wake-up packet, whether the WUR terminal can meet the at least one grouping standard. When the WUR terminal meets the at least one grouping standard, the WUR RF circuit wakes up the WUR terminal. In this way, the radio access point may wake up, by using the WUR wake-up packet, all WUR terminals whose group identifiers are the same as the group identifier in the WUR wake-up packet, to wake up a plurality of WUR terminals at a time. The radio access point does not need to send the wake-up packet to each WUR terminal in sequence, thereby reducing a quantity of wake-up packets sent by the radio access point, reducing air interface time and saving resources of the radio access point, and reducing network overheads. In addition, the radio AP does not need to interact with the WUR terminal, and the WUR RF circuit may determine, based on the grouping standard in the WUR wake-up packet, whether the WUR terminal needs to be woken up. An implementation process is simple.

In the embodiment shown in FIG. 2, the radio AP may group the WUR terminals in any manner, and notify each WUR terminal of the corresponding group identifier through interaction with each WUR terminal. When WUR terminals are woken up, a plurality of WUR terminals in the target group are woken up in a unit of a group. In the embodiment shown in FIG. 3, the radio AP does not need to interact with the WUR terminal. The grouping standard in the WUR wake-up packet indicates a standard to be met by the WUR terminals that the radio AP attempts to wake up. The WUR RF circuit directly determines, based on the grouping standard in the WUR wake-up packet, whether the WUR terminal needs to be woken up. An implementation process is simple. The grouping manner of the radio AP is not limited in the embodiment shown in FIG. 2. In the embodiment shown in FIG. 3, the implementation process is simple, and operations are convenient. Therefore, the user can select, based on a specific requirement of an application scenario, an implementation manner in which the radio AP wakes up the plurality of WUR terminals at a time.

Figure 4:
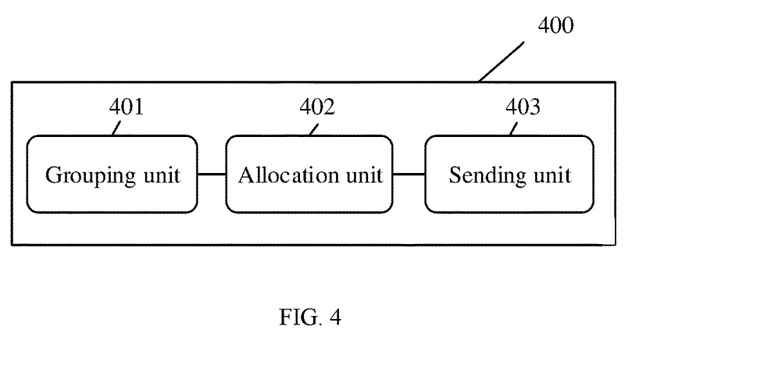
FIG. 4 is a schematic block diagram of an apparatus for waking up a WUR terminal in a wireless network according to an embodiment of the present disclosure.

FIG. 4 is a schematic block diagram of an apparatus 400 for waking up a WUR terminal in a wireless network according to an embodiment of the present disclosure. As shown in FIG. 4, the apparatus 400 includes: a grouping unit 401 configured to group at least one WUR terminal into at least one group according to a grouping rule; an allocation unit 402 configured to allocate a group identifier to each of the at least one group; and a sending unit 403 configured to send a corresponding group identifier to each of the at least one WUR terminal, where the sending unit 403 is further configured to send a WUR wake-up packet including a group identifier of a target group, to attempt to wake up all WUR terminals in the target group.

In this embodiment of the present disclosure, the apparatus 400 groups WUR terminals, allocates the group identifier of each group, and sends the corresponding group identifier to each WUR terminal. When waking up a WUR terminal, the apparatus 400 sends the WUR wake-up packet including the group identifier of the target group, to attempt to wake up all WUR terminals in the target group, so that a WUR terminal that is in WUR terminals receiving the wake-up packet and whose group identifier is the same as the group identifier in the wake-up packet may be woken up, to wake up a plurality of WUR terminals at a time. The apparatus 400 does not need to send the wake-up packet to each WUR terminal in sequence, thereby reducing a quantity of wake-up packets sent by the radio access point, reducing air interface time and saving resources of the radio access point, and reducing network overheads. In addition, the apparatus 400 may group the WUR terminals in any manner. This can meet a plurality of user requirements and has wide application scenarios.

It may be understood that the grouping unit is further configured to group the at least one WUR terminal into the at least one group based on a feature of the at least one WUR terminal and the grouping rule, where the feature includes at least one of the following: a type of the corresponding WUR terminal, an identifier of the corresponding WUR terminal, and a time at which the corresponding WUR terminal is associated with the radio access point.

The apparatus 400 for waking up a WUR terminal in a wireless network according to this embodiment of the present disclosure may correspond to an execution body in the method for waking up a WUR terminal in a wireless network according to the embodiments of the present disclosure. The foregoing and other operations and/or functions of each module in the apparatus 400 for waking up a WUR terminal in a wireless network are used to implement corresponding procedures of the method performed by the radio access point in FIG. 2. For brevity, details are not described herein again.

Figure 5:
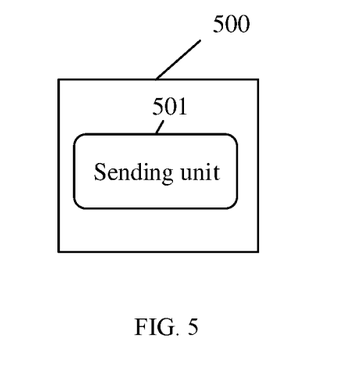
FIG. 5 is a schematic block diagram of an apparatus for waking up a WUR terminal in a wireless network according to another embodiment of the present disclosure.

FIG. 5 is a schematic block diagram of an apparatus 500 for waking up a WUR terminal in a wireless network according to an embodiment of the present disclosure. As shown in FIG. 5, the apparatus 500 includes: a sending unit 501 configured to send a wake-up radio WUR wake-up packet including at least one grouping standard, to attempt to wake up all WUR terminals meeting the at least one grouping standard.

In this embodiment of the present disclosure, when waking up a WUR terminal, the apparatus 500 sends the WUR wake-up packet including the at least one grouping standard, so that a WUR terminal that is in WUR terminals receiving the WUR wake-up packet and that meets the at least one grouping standard is woken up, to wake up a plurality of WUR terminals at a time. The apparatus 500 does not need to send the wake-up packet to each WUR terminal in sequence, thereby reducing a quantity of wake-up packets sent by the radio access point, reducing air interface time and saving resources of the radio access point, and reducing network overheads. In addition, the apparatus 500 does not need to interact with the WUR terminal, and a WUR RF circuit may determine, based on the grouping standard in the WUR wake-up packet, whether the WUR terminal needs to be woken up. An implementation process is simple.

It may be understood that the at least one grouping standard includes at least one of the following: a type of a WUR terminal, duration for which a WUR terminal is in a sleep state, a location range of a WUR terminal, identifiers of a plurality of WUR terminals, an identifier of a radio access point associated with a WUR terminal, and a parameter set associated with a WUR terminal, where the parameter set includes an identifier of a radio access point associated with the WUR terminal and association duration.

The apparatus 500 for waking up a WUR terminal in a wireless network according to this embodiment of the present disclosure may correspond to an execution body in the method for waking up a WUR terminal in a wireless network according to the embodiments of the present disclosure. The foregoing and other operations and/or functions of each module in the apparatus 500 for waking up a WUR terminal in a wireless network are used to implement corresponding procedures of the method performed by the radio access point in FIG. 3. For brevity, details are not described herein again.

Figure 6:
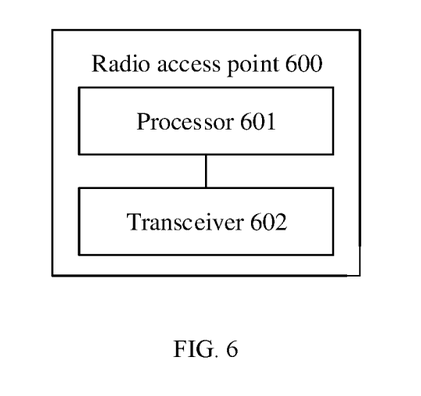
FIG. 6 is a schematic block diagram of a radio access point according to an embodiment of the present disclosure.

FIG. 6 is a schematic block diagram of a radio access point 600 according to an embodiment of the present disclosure. As shown in FIG. 6, the radio access point 600 includes a processor 601 and a transceiver 602. The processor 601 may include a CPU, a network processor (NP), an RF circuit, an application-specific integrated circuit (ASIC), a programmable logic device (PLD), or any combination thereof. The PLD may be a complex PLD (CPLD), a field-programmable gate array (FPGA), a generic array logic (GAL), or any combination thereof. The RF circuit is also referred to as an RF module, and is an electronic device that sends and/or receives a radio signal between devices. Circuits in the processor may be independent, or may be integrated into one or more chips.

The transceiver 602 may be an antenna. The antenna may include an array antenna, a multi-band antenna, a microstrip antenna, a directional antenna, or any other type of antenna. The processor 601 sends and receives a radio signal by using the transceiver 602.

Optionally, the radio access point 600 further includes a memory. The memory may be an independent device or may be integrated in the processor 601. The memory may include a volatile memory, for example, a random-access memory (RAM). The memory may also include a non-volatile memory, for example, a read-only memory (ROM), a flash memory, a compact disc, a magnetic tape, a floppy disk, a hard disk, or a solid-state drive. The memory may further include any combination of the foregoing types of memories. If the processor 601 needs program code, the memory may store program code and transmit the program code to the processor 601, so that the processor 601 implements the embodiments of the present disclosure according to instruction of the program code.

The radio access point 600 according to this embodiment of the present disclosure may correspond to an execution body in the method for waking up a WUR terminal in a wireless network according to the embodiments of the present disclosure. Operations and/or functions in the radio access point 600 are used to implement corresponding procedures of the method performed by the radio access point in FIG. 2 and/or FIG. 3. For brevity, details are not described herein again.

Figure 7:
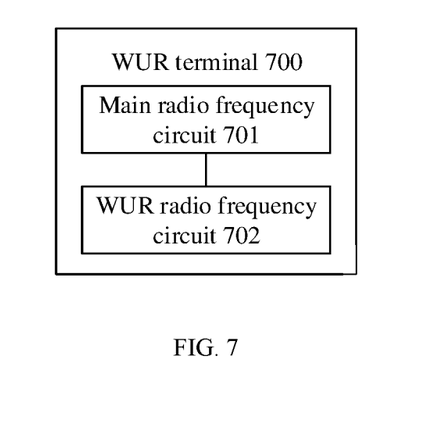
FIG. 7 is a schematic block diagram of a WUR terminal according to an embodiment of the present disclosure.

FIG. 7 is a schematic block diagram of a WUR terminal 700 according to an embodiment of the present disclosure. As shown in FIG. 7, the WUR terminal 700 includes a main RF circuit 701 and a WUR RF circuit 702. There may be one or more main RF circuits 701. There may be one or more WUR RF circuits 702. The main RF circuit 701 and the WUR RF circuit 702 may share an antenna. The main RF circuit 701 and the WUR RF circuit 702 may alternatively use respective antennas.

The WUR terminal 700 according to this embodiment of the present disclosure may correspond to an execution body in the method for waking up a WUR terminal in a wireless network according to the embodiments of the present disclosure. Operations and/or functions in the WUR terminal 700 are used to implement corresponding procedures of the method performed by the WUR terminal in FIG. 2 and/or FIG. 3. For brevity, details are not described herein again.

An embodiment of the present disclosure provides a system for waking up a WUR terminal in a wireless network, including the radio access point 600 shown in FIG. 6 and the WUR terminal 700 shown in FIG. 7.

The system for waking up a WUR terminal in a wireless network in this embodiment of the present disclosure may include one or more WUR terminals 700 shown in FIG. 7.

All or some of the foregoing embodiments may be implemented by using software, hardware, or a combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, a twisted pair, an optical fiber) or wireless (for example, infrared, microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like.

What is claimed is:

1. A method implemented by an access point (AP) and comprising:
grouping at least one wake-up radio (WUR) terminal into a group according to a grouping rule;
sending, to the at least one WUR terminal, a first group identifier identifying the group, and
sending, to the at least one WUR terminal, a WUR wake-up packet comprising a second group identifier of a target group to attempt to wake up all WUR terminals in the target group.

2. The method of claim 1, wherein the grouping rule comprises grouping the at least one WUR terminal into the group based on a feature of the at least one WUR terminal.

3. The method of claim 2, wherein the feature comprises a type of the at least one WUR terminal.

4. The method of claim 1, further comprising allocating the first group identifier to the group.

5. The method of claim 1, wherein the first group identifier and the second group identifier are the same.

6. The method of claim 2, wherein the feature comprises an identifier of the at least one WUR terminal.

7. The method of claim 1, further comprising avoiding sequentially sending the WUR wake-up packet to all of the WUR terminals in the target group.

8. The method of claim 2, wherein the feature comprises a time at which the at least one WUR terminal is associated with the AP.

9. A method implemented by a first access point (AP) and comprising:
sending a wake-up radio (WUR) wake-up packet comprising a grouping standard to attempt to wake up all WUR terminals meeting the grouping standard,
wherein the grouping standard comprises an identifier of a second AP,
wherein the WUR terminals are associated with the second AP,
wherein the identifier is based on a medium access control (MAC) address of the second AP, and
wherein the identifier is shorter than the MAC address.

10. The method of claim 9, wherein the first AP and the second AP are the same.

11. The method of claim 9, further comprising generating the WUR wake-up packet.

12. An access point (AP) comprising:
a memory configured to store instructions; and
a processor coupled to the memory and configured to execute the instructions to:
group at least one a wake-up radio (WUR) terminal into a group according to a grouping rule;
send, to the at least one WUR terminal, a first group identifier, identifying the group; and
send, to the at least one WUR terminal, a WUR wake-up packet comprising a second group identifier of a target group to attempt to wake up all WUR terminals in the target group.

13. The AP of claim 12, wherein the grouping rule comprises grouping the at least one WUR terminal into the group based on a feature of the at least one WUR terminal.

14. The AP of claim 13, wherein the feature comprises a type of the at least one WUR terminal.

15. The AP of claim 12, wherein the processor is further configured to allocate the first group identifier to the group.

16. The AP of claim 12, wherein the first group identifier and the second group identifier are the same.

17. The AP of claim 13, wherein the feature comprises an identifier of the at least one WUR terminal.

18. The AP of claim 13, wherein the feature comprises a time at which the at least one WUR terminal is associated with the AP.

19. A first access point (AP) comprising:
a memory configured to store instructions; and
a processor coupled to the memory and configured to execute the instructions to:
generate a wake-up radio (WUR) wake-up packet comprising a grouping standard; and
send the WUR wake-up packet to attempt to wake up all WUR terminals meeting the grouping standard, wherein the grouping standard comprises an identifier of a second AP,
wherein the WUR terminals are associated with the second AP,
wherein the identifier is based on a medium access control (MAC) address of the second AP, and
wherein the identifier is shorter than the MAC address.

20. The first AP of claim 19, wherein the first AP and the second AP are the same.

\* \* \* \* \*

UNITED STATES PATENT AND TRADEMARK OFFICE
CERTIFICATE OF CORRECTION

PATENT NO. : 11,252,662 B2
APPLICATION NO. : 16/800026
DATED : February 15, 2022
INVENTOR(S) : Yungui Wang

It is certified that error appears in the above-identified patent and that said Letters Patent is hereby corrected as shown below:

In the Claims

Claim 1, Column 19, Line 63: "the group, and" should read "the group; and"

Claim 12, Column 20, Line 41: "identifier, identifying the group; and" should read "identifier identifying the group; and"

Signed and Sealed this
Third Day of May, 2022

Katherine Kelly Vidal
*Director of the United States Patent and Trademark Office*